Nov. 3, 1931.       F. A. GERLING       1,830,103
PISTON LUBRICATOR
Filed Dec. 12, 1929
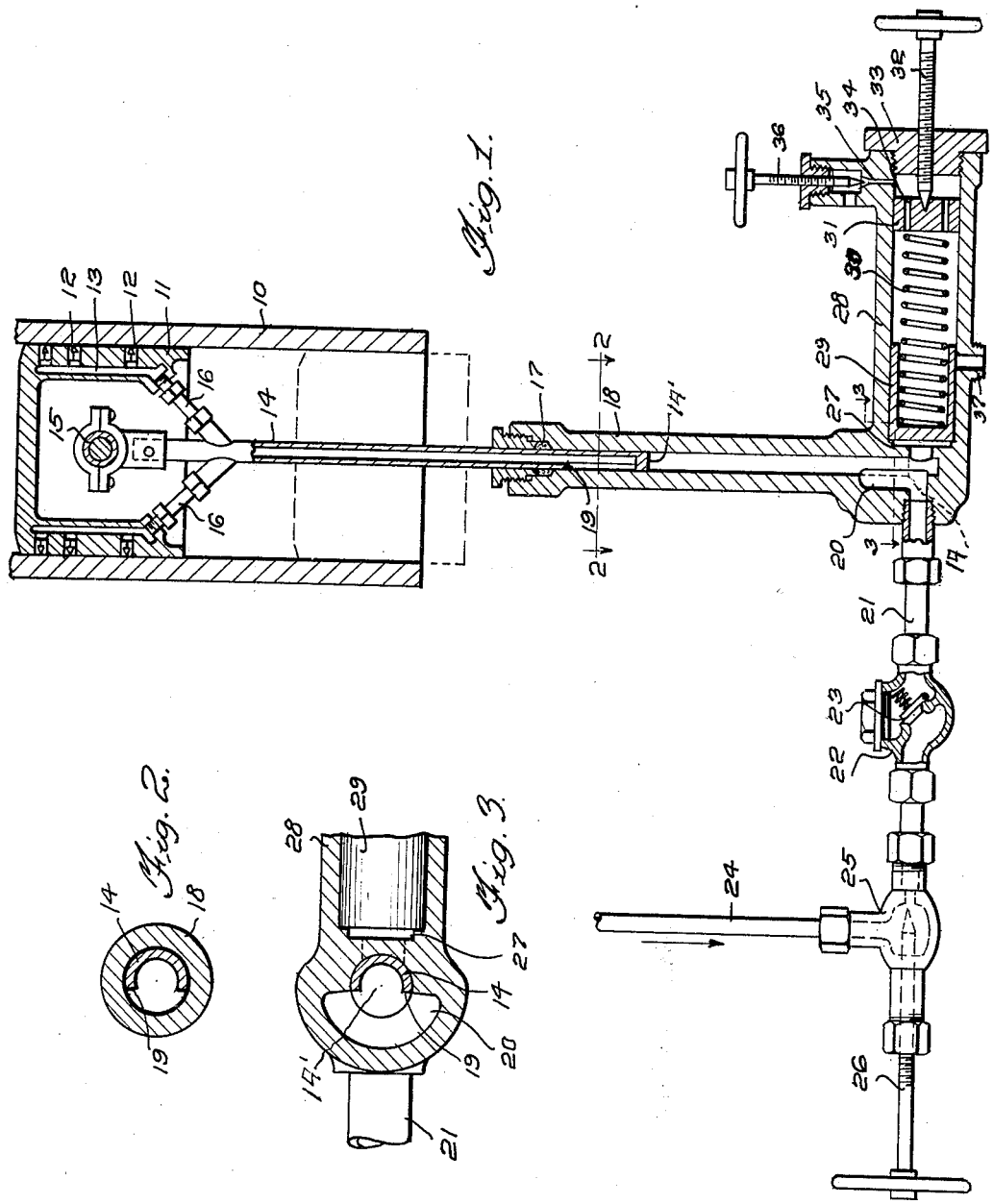
INVENTOR.
FRED A. GERLING,
BY Jerry A Mathews
ATTORNEY.

Patented Nov. 3, 1931

1,830,103

UNITED STATES PATENT OFFICE

FRED A. GERLING, OF BOISE, IDAHO

PISTON LUBRICATOR

Application filed December 12, 1929. Serial No. 413,622.

My invention relates to improvements in pumps for oil or the like, and more particularly to pumps for lubricating pistons and cylinders of motors, although not necessarily restricted to this use.

An important object of my invention is the provision of a device for forcing lubricant or other fluid of any consistency into any part of a machine where such lubricant or fluid is needed or desired.

Another object of my invention is to provide a device of this character in which the pressure of the lubricant or other fluid may be readily varied to suit different or varying conditions.

A further object of my invention is the provision of a device of the above mentioned character which may be applied to a piston of a motor to lubricate the cylinder thereof, and to expand the packing rings on said piston into intimate contact with such cylinder.

A still further object of my invention is to provide a device of this character which is simple in construction, positive and efficient in operation, strong and durable.

Other objects and advantages of my invention will be apparent during the course of the following description.

In the accompanying drawings, forming a part of this specification, and in which like numerals are employed to designate like parts throughout the same, Figure 1 is a vertical sectional view, parts being in elevation, of my improved pump, showing it applied to the piston of an engine, Figure 2 is a transverse section taken on line 2—2 of Figure 1, and Figure 3 is a similar view taken on line 3—3 of Figure 1.

In the drawings, wherein for the purpose of illustration, is shown a preferred embodiment of my invention, the numeral 10 designates a cylinder of an engine having a piston 11 arranged to reciprocate therein. Packing rings 12 are arranged in the usual ring grooves of said piston, and a pair of oil ducts 13 are arranged longitudinally of said piston, interiorly thereof, and connect the ring grooves in which the rings 12 are located. These ducts are shown as two in number, arranged on opposite sides of the piston, but any number or arrangement of ducts may be employed.

A pump plunger 14 is shown as tubular in form and is connected to the wrist pin 15 of the piston, although it can obviously be connected to any other convenient portion of the piston. Suitable hollow branches 16 connect the upper end of the plunger to the ducts 13. The plunger 14 extends through a packing gland 17 into the pump cylinder 18. A suitable opening or slot 19 is located in the side of the tubular plunger at the lower end of the plunger and is adapted to register with an enlarged chamber 20 at the lower end of the plunger cylinder 18. The lower end of the tubular plunger 14 is closed, as shown at 14'. If desired, the slot 19 may be dispensed with and the lower end of the plunger formed completely open.

An oil or other fluid supply pipe 21 connects with the inlet opening 20 and is provided with a valve chamber 22, in which a suitable spring pressed check valve 23 is arranged. The oil is supplied by force feed or gravity through the pipe 24 which is illustrated as connected to the supply pipe 21 by means of an inverted T-shaped coupling 25, in which a suitable needle valve 26 is located. It will be seen that the supply of oil or other fluid may be controlled by operation of the needle valve 26.

The pump cylinder 18 is provided with a port 27 arranged opposite to and preferably in line with the supply pipe 21 and inlet chamber 20. The port 27 connects the interior of the pump cylinder with the interior of a piston cylinder 28 arranged at the lower end of the plunger cylinder at a right angle thereto and preferably in line with the supply pipe 21. A piston 29 is slidably arranged in the piston cylinder 28 and is engaged by a suitable coil spring 30 the opposite end of which bears against a movable follower 31. The position of the follower 31 in the expansion cylinder 28 can be adjusted by the pointed adjusting screw 32 operating through the removable end 33 of the expansion cylinder. The spring 30 resiliently forces the piston 29 towards the pump cylinder 18 and its tension is adjustable by varying the position of the follower 31 through the medium of the screw 32. Suitable openings 34 extend through the follower 31 and connect the portion of the cylinder 28 behind the piston 29 with that portion of the cylinder behind the follower 31. An air vent 35 is arranged in the cylinder 28 behind the follower 31 and is controlled by a needle valve 36 of any suitable construction.

In operation, the oil or other fluid which enters the pump cylinder through the valve 23 and supply pipe 21 is forced upwardly through the plunger 14 by the downward movement of the plunger which is reciprocated by the operation of the piston 11 in the engine cylinder, and is forced through the branches 16 and ducts 13 into the ring grooves behind the packing rings 12 which are consequently expanded by the pressure of the oil. The oil finds its way around the rings, or through suitable radial openings therein, to lubricate the cylinder walls.

When the maximum pressure of the column of oil in the plunger 14, branches 16, ducts 17 and ring grooves has been reached the oil in supply pipe 21 is forced back against check valve 23, closing the same, thereby causing the oil in pump cylinder 18 to be forced through port 27 against piston 29 in the longitudinal cylinder 28, which gives against the pressure of the spring 30 and of the air in the cylinder 28, to allow the plunger 14 to complete its downward stroke. The air compressed by the movement of the piston 29 escapes through the openings 34 in the follower to the air vent 35. A suitable relief opening 37 is arranged in the cylinder 28 at a point spaced from the pump cylinder 18 and if piston 29 is moved to or beyond this relief opening due to excess pressure or to any other causes, the excess oil overflows through relief 37 and may be returned to the supply tank in any convenient manner.

As the plunger 14 begins its upward stroke, the pressure on the oil in the pump cylinder 18 is released, thereby releasing an equal displacement volume in cylinder 28. After piston 29 reaches the end of its movement, further upward movement of the plunger 14 draws oil through the check valve 23 and supply pipe 21 to replace that forced through the plunger 14 to the rings.

It will be noted that the piston 29 has a much greater diameter than the plunger 14 and that consequently a relatively small movement of the piston 29 will correspond in displacement of oil to a relatively large movement of the plunger 14. It is believed obvious that this pump may be advantageously used for other purposes than that illustrated, and that I, in no way, limit myself to the application of my invention herein shown and described.

With the lower end 14' of the plunger 14 closed, upon the up stroke of the plunger 14 oil enters the cylinder 18, and when the plunger 14 descends, the oil in the lower end of cylinder 18 acts against the spring pressed piston, and is yieldingly held under pressure, so that when the slot 19 registers with chamber, the piston 29 moves forward and forces the oil upwardly through the tubular plunger 14. The downward movement of the plunger 14 is indicated by dotted lines, and does not prevent communication between the cylinder 28 and chamber 20.

While I have shown and described the preferred form of my invention, it is to be understood that various changes in the size, shape and arrangement of parts may be resorted to without departing from the spirit of my invention, or the scope of the subjoined claims.

Having thus described my invention, I claim:—

1. The combination with a cylinder, of a piston to reciprocate therein, said piston having ring receiving grooves, a tubular plunger connected with the piston and in communication with said grooves for supplying a lubricant thereto, said tubular plunger having its free end closed and provided rearwardly of the same with an opening in its side, a pump cylinder receiving the tubular plunger therein, inlet means connected with the pump cylinder and having a check valve opening toward the pump cylinder, an expansion chamber connected with the pump cylinder, a piston slidable within the expansion chamber, and yielding means to move the last-named piston.

2. The combination with a cylinder, of a piston reciprocated therein, said piston having ring receiving grooves, a tubular plunger connected with the piston to move therewith and having communication with said grooves, said tubular plunger having its free end closed and provided inwardly of such free end with an opening in its side, a pump cylinder having a bore slidably receiving the tubular plunger, said bore being provided in its side with a recess adapted to register with the opening in the side of the tubular plunger, an inlet pipe leading into the recess and having a check valve opening toward said recess, an expansion chamber communicating with the bore of the pump cylinder near said recess, and a spring-pressed piston slidable within said expansion chamber.

3. The combination with a cylinder, of a piston reciprocated therein, said piston having ring-receiving grooves, a tubular plunger connected with the piston to move therewith and having communication with said grooves, said tubular plunger having its free end closed and provided inwardly of such free end with an opening in its side, a pump cylinder having a bore slidably receiving the tubular plunger, said bore being provided in its side with a recess adapted to register with the opening in the side of the tubular plunger, an inlet pipe leading into the recess and having a check valve opening toward said recess, an expansion chamber communicating with the bore of the pump cylinder near said recess, a piston slidable within the expansion chamber, but spring-pressed to force the last-named piston toward the pump cylinder, and adjustable means to regulate the tension of the spring.

In testimony whereof I affix my signature.

FRED A. GERLING.